(12) United States Patent
Xiong et al.

(10) Patent No.: US 11,110,607 B2
(45) Date of Patent: Sep. 7, 2021

(54) SERVO OUTPUT SHAFT ROTATIONAL ANGLE CALIBRATION METHOD AND SYSTEM AND ROBOT USING THE SAME

(71) Applicant: UBTECH ROBOTICS CORP LTD, Shenzhen (CN)

(72) Inventors: Youjun Xiong, Shenzhen (CN); Hanyu Sun, Shenzhen (CN); Lifu Zhang, Shenzhen (CN); Wenhua Fan, Shenzhen (CN); Zhongliang Wang, Shenzhen (CN); Yongping Zeng, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 242 days.

(21) Appl. No.: 16/535,108

(22) Filed: Aug. 8, 2019

(65) Prior Publication Data
US 2020/0206936 A1    Jul. 2, 2020

(30) Foreign Application Priority Data
Dec. 29, 2018  (CN) .......................... 201811640669.1

(51) Int. Cl.
*B25J 9/16*  (2006.01)
*B25J 9/12*  (2006.01)

(52) U.S. Cl.
CPC .............. *B25J 9/1692* (2013.01); *B25J 9/126* (2013.01)

(58) Field of Classification Search
CPC ........ B25J 9/1692; B25J 9/126; B25J 9/1664; B25J 9/1602; B25J 3/04; B25J 9/04; B25J 18/007; B25J 18/04; B25J 17/0233; B25J 9/101; B25J 9/1005; B25J 9/1641; G05B 2219/37545; G05B 2219/39041; G05B 2219/41095; G05B 2219/41098; G05B 2219/41099; G05B 2219/39024
See application file for complete search history.

(56) References Cited

U.S. PATENT DOCUMENTS

| 10,538,339 B2* | 1/2020 | Conyers ..................... H02J 7/35 |
| 2010/0026230 A1* | 2/2010 | Lee .......................... G05B 19/19 318/627 |
| 2019/0022866 A1* | 1/2019 | Kawase .................. B25J 9/1633 |
| 2019/0039246 A1* | 2/2019 | Kokubo ................. B25J 9/1692 |

(Continued)

FOREIGN PATENT DOCUMENTS

CN          106569512 A        4/2017

*Primary Examiner* — Abby Y Lin
*Assistant Examiner* — Esvinder Singh (57) ABSTRACT

The present disclosure provides a servo output shaft angle calibration method and a robot using the same. In the method, when a servo output shaft rotational angle calibration instruction is obtained, an output shaft of a servo is controlled to move in a preset rotational direction, a current angle of the output shaft of the servo is obtained when it detects that the output shaft of the servo has rotated to an end point and has a stalling, and then a preset end point angle is updated as the current angle of the output shaft of the servo, so as to take the current angle of the output shaft of the servo as the new end point angle, thereby realizing the calibration of the end point angle of the output shaft of the servo. In this manner, the entire calibration process requires no manual intervention.

20 Claims, 4 Drawing Sheets

(56) References Cited

U.S. PATENT DOCUMENTS

| | | | |
|---|---|---|---|
| 2020/0078942 A1* | 3/2020 | Nakashima | B25J 9/1664 |
| 2020/0171652 A1* | 6/2020 | Kawabata | B25J 9/1612 |
| 2020/0182224 A1* | 6/2020 | Gupta | F03D 7/0296 |
| 2021/0039260 A1* | 2/2021 | Toyoda | B25J 9/1692 |

* cited by examiner

SERVO OUTPUT SHAFT ROTATIONAL ANGLE CALIBRATION METHOD AND SYSTEM AND ROBOT USING THE SAME

TRAVERSE REFERENCE TO RELATED APPLICATION PROGRAMS

This application claims priority to Chinese Patent Application No. CN 201811640669.1, filed Dec. 29, 2018, which is hereby incorporated by reference herein as if set forth in its entirety.

BACKGROUND

1. Technical Field

The present disclosure relates to servo technology, and particularly to a servo output shaft angle calibration method and a robot using the same.

2. Description of Related Art

With the continuous development of servo technology, various types of servos continuously emerge, which makes it possible to popularize various robots driven through servos. The servos are usually disposed at each movable joint of the robot, and an output shaft of each servo is fixedly connected with a fixed position of the output shaft of the servo of the robot so that the servo can drive the joint of the robot to move when the servo operates. When installing the servo to the movable joint of the robot, it needs to calibrate the rotational angle of the output shaft of the servo. After the installation, it usually needs another calibration so as to ensure that the different rotational angles of the output shaft of the servo can correspond to different movement positions of the joint of the robot in an one-to-one manner, thereby realizing the precise control of the servo to the movement positions of the joint of the robot.

However, the existing servo output shaft angle calibration method usually requires manual intervention and requires a second calibration except the calibration when installing the servo, which is complicated and inefficient.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In order to facilitate those skilled in the art to understand the technical solutions of the present disclosure, the technical solutions in the embodiments of the present disclosure will be clearly described in conjunction with the accompanying drawings in the embodiments of the present disclosure. Apparently, the following embodiments are only part of the embodiments of the present disclosure, not all of the embodiments of the present disclosure. All other embodiments obtained by those skilled in the art based on the embodiments in the present disclosure without creative efforts are within the scope of the present disclosure.

The term "include" and its variations in the specification and claims of the present disclosure and the above-mentioned accompanying drawings are intended to cover a non-exclusive inclusion. For example, a process, method, system, product or device which includes a series of steps or units is not limited to the steps or units listed, but optionally also includes steps or units not listed, or optionally also includes other steps or units inherent to these processes, methods, products, or devices. Moreover, the terms "first", "second", "third", and the like are used to distinguish different objects, rather than describing a particular order.

Embodiment One

In this embodiment, a servo output shaft angle calibration method is provided, which can be applied to a servo of any type of robot or other mechanical movable devices equipped with the servo, for example, various humanoid robots, sweeping robots, courier sorting robots, automatic guided vehicles, or the like.

In this embodiment, for a robot having movable joints (e.g., a humanoid robot and a courier sorting robot), the servos are respectively installed on each of the movable joints. In which, a servo is driven by a motor, which is used as a joint of the robot so as to realize the movement of a limb (e.g., a hand, an arm, a leg, or a head) of the robot which connected to the joint, where the movement of the limb is realized by the motor to rotate an output shaft of the servo which is connected to the limb. A control device of the robot controls each joint to move to the corresponding positions by controlling a rotational angle of the output shaft of the servo installed on each joint. The rotational angle of the output shaft of the servo corresponds to the position of the joint in an one-to-one manner. For example, if the output shaft of the servo is rotated to the position of 0 degrees, which indicates that the joint is in a horizontal position; and if the output shaft of the servo is rotated to the position of 90 degrees, which indicates that the joint is in a vertical position. Each joint of the robot is provided with a limit mechanism, so that when the output shaft of the servo is rotated to the position of the limit mechanism of the corresponding joint, it is considered that the output shaft of the servo has rotated to an end point and the output shaft of the servo has rotated to an end point angle if a stalling has occurred to the servo.

In one embodiment, the control device of the robot may be a central processing unit (CPU), or be other general purpose control device, a digital signal processor (DSP), an application specific integrated circuit (ASIC), a field-programmable gate array (FPGA), or be other programmable logic device, a discrete gate, a transistor logic device, and a discrete hardware component. The general purpose control device may be a microprocessor, or the control device may also be any conventional control device.

Figure 1:
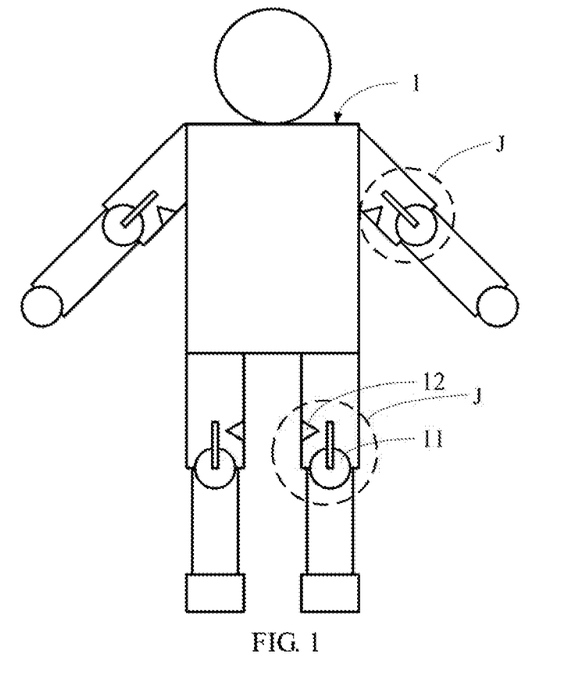
FIG. 1 is a schematic diagram of the mechanical structure of a robot according to embodiment one of the present disclosure.

FIG. 1 is a schematic diagram of the mechanical structure of a robot 1 according to embodiment one of the present disclosure. As shown in FIG. 1, the robot 1 can be a humanoid robot with joints J. Each joint J of the humanoid robot 1 includes a servo 11 and a limit mechanism 12.

It should be understood that, the structure of the humanoid robot shown in FIG. 1 is merely exemplary and is not intended to represent the real structure of the humanoid robot in practical applications. In addition, in FIG. 1, for convenience of illustration, only an approximately circular servo and a triangular limit mechanism which are positioned at elbow joints and knee joints are exemplarily shown.

Figure 2:
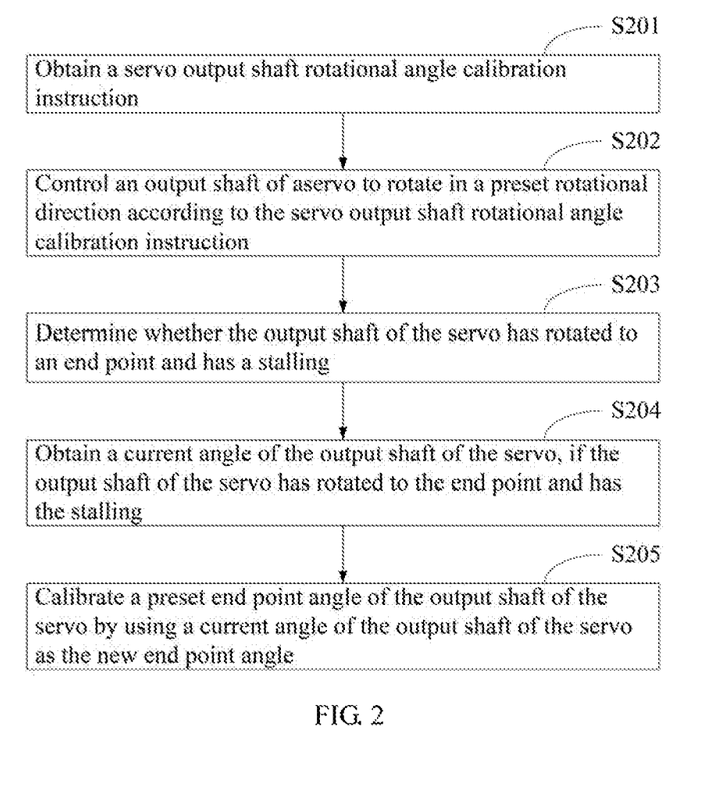
FIG. 2 is a flow chart of a servo output shaft angle calibration method according to embodiment one of the present disclosure.

FIG. 2 is a flow chart of a servo output shaft angle calibration method according to embodiment one of the present disclosure. In this embodiment, an angle calibration method for a servo having an output shaft is provided. The method is a computer-implemented method executable for a processor, which may be implemented through and applied to a servo output shaft angle calibration system shown in FIG. 3 that is for a servo or a robot shown in FIG. 4 that has at least a servo, or implemented through a storage medium. As shown in FIG. 2, the method includes the following steps.

S201: obtaining a servo output shaft rotational angle calibration instruction.

In one embodiment, the servo output shaft rotational angle calibration instruction can be input by a user through any human-computer interaction manner which can be supported by the robot on which the servo is installed, or can be automatically sent by the robot when the servo is powered on, that is, the servo output shaft rotational angle calibration instruction can be an internal instruction of the robot which is transmitted to the control device of the robot through a servo driving device (e.g., a motor) when the servo is powered on. The human-computer interaction manner can use voice control, gesture control, or button control. The servo output shaft rotational angle calibration instruction may be in the form of a message, a current signal, a level signal, a pulse signal, an optical signal, or an optical carrier.

In one embodiment, the servo output shaft rotational angle calibration instruction carries information of the preset rotational direction and the preset end point angle.

In one embodiment, the preset rotational direction refers to the direction in which the output shaft of the servo starts to rotate after powered on, and the preset end point angle refers to the maximum angle that the output shaft of the servo can be rotated after the servo is powered on.

In one embodiment, before step S201, the method includes:

setting the rotational direction and the end point angle of the output shaft of the servo in advance.

In one embodiment, the preset rotational direction and the preset end point angle may be set by the user through any human-computer interaction manner, may be directly written into the control device or a storage device of the robot when the robot is manufactured in the factory, or may be transmitted to the robot after configured through any human-machine interaction device that can be communicatively connected to the robot.

In one embodiment, before step S201, the method includes:

detecting whether the servo has powered on or not; and executing step S201, if the servo has powered on.

In one embodiment, it needs to start the calibration of the output shaft of the servo angle after the servo is powered on. In the actual applications, the same servo can be calibrated only once, be calibrated after each power-on, or be periodically calibrated.

S202: controlling the output shaft of the servo to rotate in a preset rotational direction according to the servo output shaft rotational angle calibration instruction.

In one embodiment, the output shaft of the servo can be rotated in a constant torque or a non-constant torque.

In one embodiment, step S202 includes:

controlling the output shaft of the servo to rotate in the preset rotational direction in a preset constant torque according to the servo output shaft rotational angle calibration instruction.

In this embodiment, the preset constant torque can be set according to actual needs, as long as the torque of the output shaft of the servo is not greater than the maximum output torque supported by the servo. When the output shaft of the servo is rotated at the preset constant torque, the servo is in a constant torque mode, where the constant torque mode is a constant current control mode (i.e., the magnitude of the current used to drive the output shaft of the servo to rotate is constant), so that when a stalling has occurred to the servo, the current used to drive the servo will be limited to a constant range, and the servo will not be burnt due to the stalling of the servo. When the servo is in the constant torque mode, its torque should not be too small, so as to avoid the movement of the servo to be stopped in the middle of the movement due to resistance factors such as structural friction, and its torque should not be too large, so as to avoid the movement speed of the servo to be too fast and causes structural damage.

In one embodiment, the preset constant torque is one quarter of a maximum output torque of the output shaft of the servo.

S203: determining whether the output shaft of the servo has rotated to an end point and has a stalling.

In this embodiment, whether the output shaft of the servo has rotated to the end point and has the stalling is determined. In one embodiment, whether the output shaft of the servo has rotated to the position of the end position can be detected through any type of position sensor.

In one embodiment, step S203 includes:

detecting a position of the output shaft of the servo in the preset rotational direction through a position sensor mounted on an output shaft of the servo; and determining the output shaft of the servo having rotated to the end point and having the stalling, if the position sensor detects that the position of the output shaft of the servo not changes when the output shaft of the servo rotates in the preset rotational direction.

In one embodiment, the robot includes a plurality of joints, where each of the joints is provided with servo(s) and a limit mechanism corresponding to each servo.

Correspondingly, step S203 includes:

detecting whether the output shaft of the servo has rotated to a position of the limit mechanism corresponding to the servo; and determining that the output shaft of the servo has rotated to the end point and has the stalling, if the output shaft of the servo has rotated to the position of the limit mechanism corresponding to the servo.

In one embodiment, the limiting mechanism can be a limit pin, a limit block, or any other limit structure according to actual needs.

S204: obtaining a current angle of the output shaft of the servo, if the output shaft of the servo has rotated to the end point and has the stalling.

In this embodiment, the current angle of the output shaft of the servo is obtained by obtaining the current angle of the output shaft of the servo. In one embodiment, the current angle of the output shaft of the servo should be obtained immediately at the moment when the output shaft of the servo is rotated to the end point and the stalling has occurred, so as to avoid the output shaft of the servo from continuing to rotate due to the inertia or the driving force of the driver of the servo which cause the in accuration of the obtained angle.

S205: calibrating a preset end point angle of the output shaft of the servo by using a current angle of the output shaft of the servo as the new end point angle.

The preset end point angle of the output shaft of the servo is calibrated by updating the preset end point angle of the output shaft of the servo based on the current angle of the output shaft of the serv. In this embodiment, the preset end point angle of the output shaft of the servo is updated by using the current angle of the output shaft of the servo as the new end point angle. In one embodiment, the preset end point angle is the theoretical value of the rotational angle of the output shaft of the servo which is set in advance when the output shaft of the servo is rotated to the end position, and the current angle is the actual value of the rotational angle of the output shaft of the servo when the output shaft of the servo is actually rotated to the end position. By updating the preset end point angle as the current angle, the preset end point angle can be calibrated so that the end point angle of the output shaft of the servo is equal to the actually obtained current angle.

In one embodiment, after step S205, the method includes:

terminating the angular calibration of the output shaft of the servo after the calibration of the end point angle of the output shaft of the servo.

In one embodiment, the calibration can be terminated after one angle calibration to the same servo, and the same servo is no longer calibrated again before the robot which the servo is applied on is powered off. If the time interval between the power-on and the power-off of the robot is long so that the time that the same servo continuously moves after one power-on more than a longer first preset time, calibrations can be performed to the same servo at every time interval of a second preset time within the first preset time. The first preset time and the second preset time may be set according to actual needs, or the user may trigger the robot to calibrate the angle of the output shaft of the servo through any human-computer interaction manner, so that the user can control the frequency of the angle calibration according to actual needs.

In this embodiment, when the servo output shaft rotational angle calibration instruction is obtained, the servo is controlled to move in the preset rotational direction, the current angle of the output shaft of the servo is obtained when it detects that the output shaft of the servo has rotated to the end point and has the stalling, and then the preset end point angle is updated as the current angle of the output shaft of the servo, so as to take the current angle of the output shaft of the servo as the new end point angle, thereby realizing the calibration of the end point angle of the output shaft of the servo. In this manner, the entire calibration process requires no manual intervention, and the automatic calibration of the output shaft of the servo angle can be realized, which has high calibration efficiency, simple operation, and is suitable for widespread use.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment Two

Figure 3:
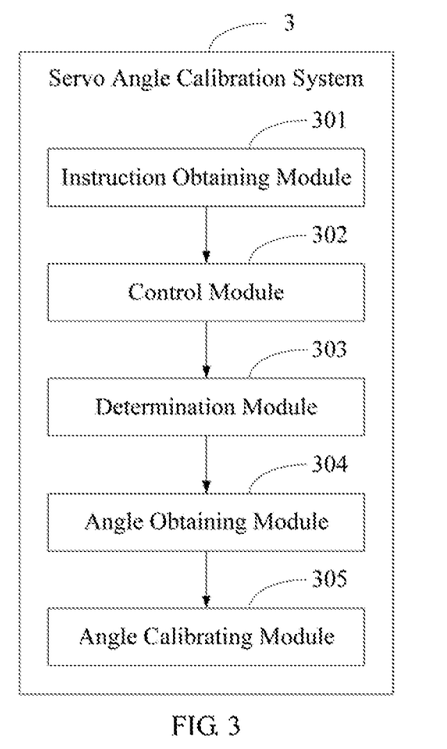
FIG. 3 is a schematic block diagram of the structure of a servo output shaft angle calibration system according to embodiment two of the present disclosure.

FIG. 3 is a schematic block diagram of the structure of a servo output shaft angle calibration system according to embodiment two of the present disclosure. As shown in FIG. 3, a servo output shaft angle calibration system 3 for executing the steps of the method of embodiment one in FIG. 1 is provided. The system may be a software system in any type of robot or other mechanical movable device equipped with a servo having an output shaft. In this embodiment, the servo output shaft angle calibration system 3 is stored in a storage of the robot and executable on a processor of the robot. In other embodiments, the servo output shaft angle calibration system 3 can be the robot itself.

The servo output shaft angle calibration system 3 includes:

an instruction obtaining module 301 configured to obtain a servo output shaft rotational angle calibration instruction;

a control module 302 configured to control the output shaft of the servo to rotate in a preset rotational direction according to the servo output shaft rotational angle calibration instruction;

a determination module 303 configured to determine whether the output shaft of the servo has rotated to an end point and has a stalling;

an angle obtaining module 304 configured to obtain a current angle of the output shaft of the servo, if the output shaft of the servo has rotated to the end point and has the stalling; and an angle calibrating module 305 configured to calibrate a preset end point angle of the output shaft of the servo by using a current angle of the output shaft of the servo as the new end point angle.

In one embodiment, the control device of the robot may be a central processing unit (CPU), or be other general control device, a digital signal processor (DSP), an application specific integrated circuit (ASIC), a field-programmable gate array (FPGA), or be other programmable logic device, a discrete gate, a transistor logic device, and a discrete hardware component. The general control device may be a microprocessor, or the control device may also be any conventional control device.

In one embodiment, the servo output shaft angle calibration system further includes:

a setting module configured to set the rotational direction and the end point angle of the output shaft of the servo in advance.

In one embodiment, the servo output shaft angle calibration system further includes:

a power-on detection module configured to detect whether the servo is powered on, and triggers the instruction obtaining module if the servo is powered on.

In one embodiment, the servo output shaft angle calibration system further includes:

a terminating module configured to terminate the angular calibration of the output shaft of the servo after the calibration of the end point angle of the output shaft of the servo.

In one embodiment, each of the above-mentioned modules can be realized by independent control devices, or can be integrated into one control device.

In this embodiment, each of the above-mentioned modules is implemented in the form of software, which can be computer program(s) stored in a memory of the servo output shaft angle calibration system 3 and executable on a processor of the robot. In other embodiments, each of the above-mentioned modules may be implemented in the form of hardware (e.g., a circuit of the servo output shaft angle calibration system 3 which is coupled to the processor of the robot) or a combination of hardware and software (e.g., a circuit with a single chip microcomputer).

In this embodiment, when the servo output shaft rotational angle calibration instruction is obtained, the servo is controlled to move in the preset rotational direction, the current angle of the output shaft of the servo is obtained when it detects that the output shaft of the servo has rotated to the end point and has the stalling, and then the preset end point angle is updated as the current angle of the output shaft of the servo, so as to take the current angle of the output shaft of the servo as the new end point angle, thereby realizing the calibration of the end point angle of the output shaft of the servo. In this manner, the entire calibration process requires no manual intervention, and the automatic calibration of the output shaft of the servo angle can be realized, which has high calibration efficiency, simple operation, and is suitable for widespread use.

Embodiment Three

Figure 4:
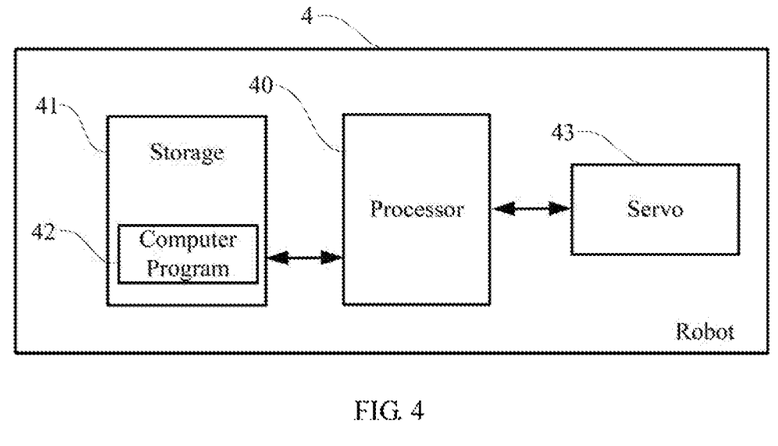
FIG. 4 is a schematic block diagram of the structure of a robot according to embodiment three of the present disclosure.

FIG. 4 is a schematic block diagram of the structure of a robot according to embodiment three of the present disclosure. As shown in FIG. 4, in this embodiment, the robot 4 includes a processor 40, a memory 41, a computer program 42 stored in the memory 41 and executable on the processor 40, for example, a servo output shaft angle calibration program, and at least a servo 43 having an output shaft. When executing (instructions in) the computer program 42, the processor 40 implements the steps in the above-mentioned embodiments of the servo output shaft angle calibration method, for example, steps S201-S205 shown in FIG. 2. Alternatively, when the processor 40 executes the (instructions in) computer program 42, the functions of each module in the above-mentioned device embodiments, for example, the functions of the modules 301-305 shown in FIG. 3 are implemented.

Exemplarily, the computer program 42 may be divided into one or more modules/units, and the one or more modules/units are stored in the storage 41 and executed by the processor 40 to realize the present disclosure. The one or more modules/units may be a series of computer program instruction sections capable of performing a specific function, and the instruction sections are for describing the execution process of the computer program 42 in the robot 4. For example, computer program 42 can be divided into an instruction obtaining module, a control module, a determination module, an angle obtaining module, and an angle calibrating module. The function of each module is as follows:

the instruction obtaining module is configured to obtain a servo output shaft rotational angle calibration instruction;

the control module is configured to control the output shaft of the servo to rotate in a preset rotational direction according to the servo output shaft rotational angle calibration instruction;

the determination module is configured to determine whether the output shaft of the servo has rotated to an end point and has a stalling;

the angle obtaining module is configured to obtain a current angle of the output shaft of the servo, if the output shaft of the servo has rotated to the end point and has the stalling; and the angle calibrating module is configured to calibrate a preset end point angle of the output shaft of the servo by using a current angle of the output shaft of the servo as the new end point angle.

In other embodiments, the above-mentioned modules may be included in the servo output shaft angle calibration system 3 of FIG. 3, and the servo output shaft angle calibration system 3 may be stored in the computer program 42.

The robot 4 may include, but is not limited to, a processor 40 and a storage 41. It can be understood by those skilled in the art that FIG. 4 is merely an example of the robot 4 and does not constitute a limitation on the robot 4, and may include more or fewer components than those shown in the figure, or a combination of some components or different components. For example, the robot 4 may further include an input/output device, a network access device, a bus, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store the computer program 42 and other programs and data required by the robot 4. The storage 41 may also be used to temporarily store data that has been or will be output.

In this embodiment, the robot 4 has the same the mechanical structure with the robot 1 of FIG. 1, that is, the robot 4 may be a humanoid robot with joints J each including a servo and a limit mechanism. In other embodiments, the robot 4 may have different mechanical structure with the robot 1 of FIG. 1.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit anti module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on one embodiment and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed system/robot and method may be implemented in other manners. For example, the above-mentioned system/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module is implemented in the form of a software functional unit and is sold or used as an independent product, the integrated module may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented angle calibration method for a servo, comprising:
   providing a robot, wherein the robot comprises a plurality of joints, each of the joints is provided with at least one servo and a limit mechanism corresponding to each servo, and the limit mechanism is installed inside the joint;
   obtaining a servo output shaft rotational angle calibration instruction;
   controlling an output shaft of the servo to rotate in a preset rotational direction according to the servo output shaft rotational angle calibration instruction;
   determining whether the output shaft of the servo has rotated to an end point and has a stalling;
   obtaining a current angle of the output shaft of the servo in response to the output shaft of the servo having rotated to the end point and having the stalling; and
   calibrating a preset end point angle of the output shaft of the servo by using the current angle of the output shaft of the servo as the preset end point angle, wherein the preset end point angle refers to a maximum angle that the output shaft of the servo can be rotated after the servo is powered on:
   wherein the step of determining whether the output shaft of servo has rotated to the end point and has the stalling comprises:
   detecting whether the output shaft of the servo has rotated to a position of the limit mechanism corresponding to the servo; and
   determining the output shaft of the servo having rotated to the end point and having the stalling in response to the output shaft of the servo having rotated to the position of the limit mechanism corresponding to the servo.

2. The method of claim 1, wherein the servo output shaft rotational angle calibration instruction carries information of the preset rotational direction and the preset end point angle.

3. The method of claim 1, wherein the step of controlling the output shaft of the servo to rotate in the preset rotational direction according to the servo output shaft rotational angle calibration instruction comprises:
   controlling the output shaft of the servo to rotate in the preset rotational direction in a preset constant torque according to the servo output shaft rotational angle calibration instruction.

4. The method of claim 3, wherein the preset constant torque is one quarter of a maximum output torque of the output shaft of the servo.

5. The method of claim 1, wherein the step of determining whether the output shaft of the servo has rotated to the end point and has the stalling further comprises:

detecting a position of the output shaft of the servo in the preset rotational direction through a position sensor mounted on the output shaft of the servo; and determining the output shaft of the servo having rotated to the end point and having the stalling, in response to the position sensor detecting the position of the output shaft of the servo not changed when the output shaft of the servo rotates in the preset rotational direction.

6. The method of claim 1, wherein before the step of obtaining the servo output shaft rotational angle calibration instruction further comprises:

setting the rotational direction and the end point angle of the output shaft of the servo in advance.

7. The method of claim 1, wherein before the step of obtaining the servo output shaft rotational angle calibration instruction, the method further comprises:

detecting whether the servo is powered on; and wherein the servo output shaft rotational angle calibration instruction is an internal instruction of the robot, and the step of obtaining the servo output shaft rotational angle calibration instruction comprises:

receiving the servo output shaft rotational angle calibration instruction from a servo driving device, in response to the servo being powered on.

8. The method of claim 7, wherein the preset rotational direction refers to a direction in which the output shaft of the servo starts to rotate after powered on.

9. The method of claim 1, wherein the servo output shaft rotational angle calibration instruction is input by a user through a voice control, a gesture control, or a button control.

10. The method of claim 1, wherein the step of controlling the output shaft of the servo to rotate in the preset rotational direction according to the servo output shaft rotational angle calibration instruction comprises:

controlling the output shaft of the servo to rotate in the preset rotational direction in a non-constant torque according to the servo output shaft rotational angle calibration instruction.

11. The method of claim 1, wherein after the step of calibrating the preset end point angle of the output shaft of the servo by using the current angle of the output shaft of the servo as the preset end point angle, the method further comprises:

terminating the angular calibration of the output shaft of the servo, wherein the same servo is no longer calibrated again before the robot which the servo is applied on is powered off.

12. The method of claim 1, wherein after the step of calibrating the preset end point angle of the output shaft of the servo by using the current angle of the output shaft of the servo as the preset end point angle, the method further comprises:

if a time that the same servo continuously moves after one power-on more than a longer first preset time, returning to execute the step of controlling the output shaft of the servo to rotate in the preset rotational direction according to the servo output shaft rotational angle calibration instruction, at every time interval of a second preset time within the first preset time.

13. The method of claim 1, wherein the servo is an approximately circular servo, the limit mechanism is a triangular limit mechanism, and the limiting mechanism is a limit pin, or a limit block.

14. The method of claim 1, wherein each of the joints is controlled to move to corresponding positions by controlling a rotational angle of the output shaft of the servo installed on each of the joints, and the rotational angle of the output shaft of the servo and the position of the joint are in one-to-one correspondence.

15. A robot, comprising:

a memory;

a processor;

at least one servo;

a plurality of joints, wherein each of the joints is provided with the at least one servo and a limit mechanism corresponding to each servo, and the limit mechanism is installed inside the joint; and one or more computer programs stored in the memory and executable on the processor, comprising:

instructions for obtaining a servo output shaft rotational angle calibration instruction;

instructions for controlling an output shaft of the servo to rotate in a preset rotational direction according to the servo output shaft rotational angle calibration instruction;

instructions for determining whether the output shaft of the servo has rotated to an end point and has a stalling;

instructions for obtaining a current angle of the output shaft of the servo in response to the output shaft of the servo having rotated to the end point and having the stalling; and instructions for calibrating a preset end point angle of the output shaft of the servo by using the current angle of the output shaft of the servo as the preset end point angle, wherein the preset end point angle refers to a maximum angle that the output shaft of the servo can be rotated after the servo is powered on;

wherein the instructions for determining whether the output shaft of servo has rotated to the end point and has the stalling comprise:

instructions for detecting whether the output shaft of the servo has rotated to a position of the limit mechanism corresponding to the servo; and instructions for determining the output shaft of the servo having rotated to the end point and having the stalling in response to the output shaft of the servo having rotated to the position of the limit mechanism corresponding to the servo.

16. The robot of claim 15, wherein the servo output shaft rotational angle calibration instruction carries information of the preset rotational direction and the preset end point angle.

17. The robot of claim 15, wherein the instructions for controlling the output shaft of the servo to rotate in the preset rotational direction according to the servo output shaft rotational angle calibration instruction comprise:

instructions for controlling the output shaft of the servo to rotate in the preset rotational direction in a preset constant torque according to the servo output shaft rotational angle calibration instruction.

18. The robot of claim 17, wherein the preset constant torque is one quarter of a maximum output torque of the output shaft of the servo.

19. The robot of claim 15, wherein the instructions for determining whether the output shaft of servo has rotated to the end point and has the stalling further comprise:

instructions for detecting a position of the output shaft of the servo in the preset rotational direction through a position sensor mounted on the output shaft of the servo; and instructions for determining the output shaft of the servo having rotated to the end point and having the stalling, in response to the position sensor detecting the position of the output shaft of the servo not changed when the output shaft of the servo rotates in the preset rotational direction.

20. The robot of claim 15, the one or more computer programs further comprises:
instructions for setting the rotational direction and the end point angle of the output shaft of the servo in advance.

\* \* \* \* \*